United States Patent [19]
Petrov et al.

[11] 3,972,863
[45] Aug. 3, 1976

[54] METHOD FOR PREPARING COPOLYMERS FROM CONJUGATED DIENES AND MONOVINYLAROMATIC COMPOUNDS WITH RANDOM DISTRIBUTION OF MONOMER UNITS

[76] Inventors: Gennady Nikolaevich Petrov, Zheleznodorozhny pereulok, 7, kv. 35; Gennady Mikhailovich Tolstopyatov, Bulvar Novatorov, 88, kv. 146; Sergei Mikhailovich Krasilnikov, Petrovskaya ulitsa, 1/2, kv. 109; Nikolai Alexandrovich Juzhakov, prospekt Veteranov, 99, kv. 129; Tatyana Alexeevna Kornilova, Tallinskoe shosse, 48, kv. 55; Svetlana Mikhailovna Lashova, Novo-Izmailovsky prospekt, 69, kv. 94, all of Leningrad; Valentin Pavlovich Shatalov, ulitsa Geroev Stratosfery, 1, kv. 4, Voronezh; Leonid Vasillevich Kovtunenko, Leninsky prospekt, 13, kv. 46, Voronezh; Alexandr Julievich Shteinbok, Rostovskaya ulitsa, 46/6, kv. 71, Voronezh; Elena Yakovlevna Mandelshtam, prospekt Mira, 72, kv. 2, Moscow; Boris Sergeevich Korotkevich, Fortunatovskaya ulitsa, 31/35, kv. 71, both of Moscow, all of U.S.S.R.

[22] Filed: Mar. 5, 1974

[21] Appl. No.: 448,259

[30] Foreign Application Priority Data
Mar. 5, 1973 U.S.S.R............................ 1887246

[52] U.S. Cl.................................. 526/340; 526/89; 526/177; 526/187; 526/216

[51] Int. Cl.²...................................... C08F 236/10
[58] Field of Search............ 260/83.7, 84.3, 94.2 M, 260/880 B, 84.7

[56] References Cited
UNITED STATES PATENTS

| | | | |
|---|---|---|---|
| 2,483,887 | 10/1949 | Crouch............................. | 260/84.3 |
| 3,642,734 | 2/1972 | Cheng................................ | 260/84.3 |
| 3,872,177 | 3/1975 | Halasa.............................. | 260/83.7 |

FOREIGN PATENTS OR APPLICATIONS
46-34617  10/1972  Japan

*Primary Examiner*—Paul R. Michl
*Attorney, Agent, or Firm*—Haseltine, Lake & Waters

[57] ABSTRACT

A method of preparing copolymers of conjugated diene monomers and monovinylaromatic monomers having a random distribution of monomer units in the presence of a catalyst, metallic lithium in granules, and a modifying additive soluble in a reaction medium and consisting of reaction products of potassium or sodium carbonate, acetate or hydroxide with organo-aluminum compound of the general formula:

$AlR'_m R_n$, in which: $R'$ -can be alkyl, aryl, aralkyl, group- $OR'''$, $-SR'''$ or $-NR_2'''$; $R''$ - is alkoxy or aryloxy radicals; $R'''$ -can be hydrogen, alkyl, aryl, aralkyl; $m$ and $n$ - are integers from 0 to 3, inclusive, in case of the said carbonates and acetates, $m$ - are integers from 0 to 2, inclusive, and $n$-are integers from 1 to 3, inclusive, in case of the said hydroxides. In the above mentioned product the ratio of g-atoms of aluminum per 1 g-atom of potassium or sodium can be from 2 to 20. Copolymerization is effected in solution in liquid hydrogen solvent over a temperature range from 0° to 100°C.

18 Claims, No Drawings

METHOD FOR PREPARING COPOLYMERS FROM CONJUGATED DIENES AND MONOVINYLAROMATIC COMPOUNDS WITH RANDOM DISTRIBUTION OF MONOMER UNITS

This invention relates to methods for preparing copolymers from conjugated dienes and monovinylaromatic compounds with random distribution of monomer units (random copolymers) by solution polymerization.

The so called random copolymers are copolymers in which monovinylaromatic hydrocarbon units do not form localized blocks but are randomly distributed along a polymer chain.

Random copolymers of butadiene and styrene have already found application in rubber goods and tyre industries. Rubber articles produced from these copolymers exhibit good dynamic properties in service conditions (high abrasion resistance, cracking resistance, relatively low heat builtup in tires in the course of operation).

All the known methods for preparing said random copolymers are accomplished by copolymerizing conjugated dienes and monovinylaromatic compounds in a hydrocarbon solvent medium with the use of organolithium compounds alone or in combination with different modifying additives as catalyst. Organolithium compounds catalyze the copolymerization of conjugated dienes with monovinylaromatic compounds. The molecular weight of the copolymer formed is directly proportional to the amount of organolithium compound used.

A modifying additive which reduced the difference in copolymerization constants of monomers, in particular, of butadiene and styrene, favors a random insertion of styrene into a growing polymer chain and, hence, the formation of a copolymer with a random distribution of monomer units.

As modifying additives (randomizing agents) favoring the formation a random copolymer, compounds of different classes can be used: ethers, thioethers and tert. amines (U.S. Pat. No. 2,975,160), alkoxides of alkali metals (Brit. Patent No. 029445), phosphorus compounds, such as, hexamethylphosphorotriamide (Ger. Patent No. 1620985), barium compounds (U.S.S.R Patent No. 306632), substituted pyridines (Ger. Patent No. 1816089), metallic potassium (U.S.S.R Patent No. 334709), hydroxide, oxide, peroxide and superoxide of alkali metals (Ger. Patent No. 1947198).

The introduction of randomizing agents, such as ethers, thioethers, tert. amines, substituted pyridines, hexamethylphosphorotriamide into a catalyst system impairs the microstructure of the butadiene portion of the copolymer in that the content of 1,2-units significantly increases.

The application of randomizing agents such as barium compounds, alkali metal alkoxides, in particular, potassium butoxide, metallic potassium, presents technological difficulties, because they are not easily soluble in solvents usually used for polymerization. As dienes the diene compounds containing from 4 to 12 carbon atoms in a molecule are usually used, e.g., 1,3-butadiene, isoprene, 1,3-pentadiene, 2,3-dimethylbutadiene-1,3. Most often butadiene-1,3 or isoprene is employed. As monovinylaromatic compounds those containing from 8 to 20 carbon atoms in a molecule are used which comprise the vinyl group directly bonded to the aromatic ring, e.g., styrene, vinyltoluene, vinylnaphthalene. Styrene is usually utilized.

As solvents liquid aliphatic, aromatic or cycloaliphatic hydrocarbons are used which contain no more than 20 carbon atoms in a molecule, such as pentane, n-hexane, n-heptane, benzene, cyclohexane, petroleum ether, etc.

A method is known for producing random copolymers by copolymerizing conjugated dienes and monovinylaromatic compounds in a hydrocarbon solvent medium using a catalyst based on lithium in combination with a randomizing agent, the latter being potassium aluminate of the formula $R_1R_2AlOK$ which is soluble in a hydrocarbon solvent (Japan. Patent No. 46-34617).

Potassium aluminate of the above formula is efficient in the copolymerization process as an agent favoring the formation of a random copolymer in the presence of an organolithium compounds as a catalyst.

However when metallic lithium is used as a catalyst (in this case an additional molecular weight control is needed) potassium aluminate as a modifying additive fails to act in a proper way simultaneously as a randomizing agent and a molecular weight regulator.

A known method for producing copolymers from conjugated dienes and monovinylaromatic compounds makes possible the preparation of random copolymers from said monomers (U.S.S.R. Patent No. 248976). The method is accomplished by carrying out the copolymerization in the medium of an usage hydrocarbon solvent at a temperature of 0° to 100°C using a catalyst system comprising metallic lithium in granules and trialkyl aluminum, in particular, triisobutyl aluminum which acts as a molecular weight regulator. To initiate the polymerization process metallic lithium is utilized in granules whose size favors their separation from solution. The polymerization mixture comprising both monomers is passed through a layer of coarse lithium granules suspended in the reaction medium at a rate comparable to that of the initiation process. The polymerization can be carried out as a batch process with a repeated usuage of the same portion of catalyst on condition that the polymer viscosity is such that separation of the metal granules from the polymer solution is possible. The process can also be practiced in a continuous manner.

Said process is far less sensitive to the presence of impurities in monomers and in solvent than known processes carried out with the use of an organolithium catalyst. This is achieved due to the metal surface being regenerated all the time as a result of its abrasion by friction of the granules. The process shows a good reproducibility as to the length of the induction period in a set of experiments performed under similar conditions.

However said process has some disadvantages. Copolymers of conjugated dienes and vinylaromatic compounds obtained in a batch process contain significant amounts of styrene in the form of blocks. When the process is performed continuously the efficiency of equipment for production of random copolymers is very low, for in order to prevent the formation of styrene blocks it is necessary to lower the monomer feed rate to a definite level which is limited by the polymerization rate of the comonomers.

The aim of the present invention is to eliminate said disadvantages.

It is an object of the present invention to provide an efficient method for producing random copolymers which will make possible the employment of metallic lithium as a catalyst for the preparation of copolymers from conjugated dienes and vinylaromatic compounds with random distribution of monovinylaromatic units along the polymer chain.

This object has been accomplished by the development of a method for preparing copolymers of conjugated dienes and monovinylaromatic compounds with a random distribution of monomer units by copolymerizing said monomers in the medium of a liquid hydrocarbon solvent, which is inert to the starting components at a temperature within the range of 0° to 100°C in the presence of a catalyst comprising metallic lithium in the form of granules and a modifying additive which is soluble in said hydrocarbon solvents and which according to the present invention is the reaction product of sodium or potassium carbonate, acetate or hydroxide and an organoaluminum compound of the general formula $AlR_m' R_n''$ wherein:

R' is an alkyl, aryl, aralkyl radical or —OR''', —SR''' or —NR$_2$''' group,

R'' is an alkoxy or aryloxy radical

R''' is a hydrogen, alkyl, aryl or aralkyl (radical)

$m$ and $n$ are integers from 0 to 3, inclusive, in the case of said carbonate and acetate;

$m$ is an integer from 0 to 2, inclusive, and $n$ is an integer from 1 to 3, inclusive, in the case of said hydroxides, in which the ratio of g-atoms of aluminum to a g-atom of K or Na is in the range of 2 to 20, the modifying additive being used in amounts comprising from $1.10^{-5}$ to $2.10^{-1}$ g-atom of aluminum per 100 g of comonomers.

Said modifying additive of the present invention acts as a molecular weight modifier and as a randomizing agent (an agent which favors the formation of a random copolymer).

It is completely soluble in the reaction mixture and seems to be an organometallic compound of a solvate type having the general formula $(AlR_m' R_n'')_y \cdot MeX_z$, wherein R', R'', $n$, $m$, are as given above, Me is an alkali metal K or Na, X is a carbonate, acetate or hydroxyl anion, $y$ and $z$ can vary in a wide range, so that the ratio Al/Me (g.-atoms) can vary within the range of 2 to 20.

By varying the amount of the modifying additive used it is possible to control the molecular weight of copolymers formed within a wide range of several thousands to several hundred thousands. The modifying additive can be employed in amounts comprising from $10^{-5}$ to $2.10^{-1}$ g.-atom of aluminum per 100 g of comonomers. It is advantageous to use the modifying additive in amounts comprising from $1.10^{-4}$ to $1.10^{-3}$ g.-atom of aluminum per 100 g of comonomers. In these cases copolymers are obtained having an optimum molecular weight which are easily processed into industrial rubber goods.

The additives of the present invention are characterized by a high efficiency in the copolymerization process leading to the formation of a copolymer with a random distribution of monomer units in a polymer chain.

The ratio Al/Me in the additive can vary from 2 to 20. It is most advantageous to use the modifying additive with the ratio of Al/Me within the range of 3 to 10. This ratio makes possible the preparation of copolymers containing no styrene blocks with a microstructure of the diene portion of the copolymer which practically does not differ from that of the copolymer obtained in the presence of an organolithium compound.

As starting compounds for the preparation of modifying additives there can be used potassium or sodium acetates, carbonates or hydroxides as well as organoaluminum compounds of the general formula $AlR_m' R_m''$, e.g., triethyl aluminum, triisobutyl aluminum, triphenyl aluminum, diethylphenyl aluminum, diisobutylisobutoxy aluminum, isobutyldiisobutoxy aluminum, triisobutyxy aluminum, etc.

The modifying additives prepared from $AlR_m' R_n''$, wherein R' = R'' is an alkyl or an aryl radical, e.g., ethyl, butyl, isobutyl, phenyl, are not very sensitive to the presence of impurities such as moisture, oxygen and oxygen-containing compounds, for if they do react with said impurities the reaction products formed also act as modifying additives.

Technologically most advantageous is the use as a modifying agent of the reaction product of isobutyldiisobutoxy aluminum and potassium hydroxide at the ratio of Al/K=4,7 (in g.-atoms).

The polymerization is carried out at a temperature within the range of 0° to 100°C, preferably 60°–80°, in an inert gas atmosphere. It is possible to carry out the polymerization at reduced pressure, which is achieved by means of preevacuation of the reaction vessel.

As dienes the diene compounds containing from 4 to 12 carbon atoms in a molecule can be used e.g., 1,3-butadiene, isoprene, 1,3-pentadiene, 2,3-dimethyl-butadiene-1,3; the employment of 1,3-butadiene and isoprene as a conjugated diene is preferred.

As monovinylaromatic compounds there can be used compounds containing from 8 to 20 carbons in a molecule which comprise the vinylgroup bonded directly to the aromatic ring, e.g., styrene vinylnaphthalene, vinyltoluene; the use of styrene is preferred. Most preferred for preparing random copolymers from conjugated dienes and monovinylaromatic compounds is the employment of 1,3-butadiene in combination with styrene.

As a solvent, liquid aliphatic, aromatic or cycloaliphatic hydrocarbons can be utilized. It is advantageous to use hydrocarbons containing from 4 to 10 carbons in a molecule, e.g., isopentane, pentane, hexane, heptane, toluene, benzene, petroleum ether, cyclohexane etc.

To reduce the amount of the modifying additive introduced it is advisable to use as solvent a mixture of aliphatic and methylaromatic hydrocarbons. Using a solvent mixture in combination with the catalyst system consisting of metallic lithium in the form of granules and a modifying additive, e.g., an organopotassiumaluminum compound, it is possible to prepare copolymers of the desired molecular weight. Most advantageous is the employment of hexane-toluene mixture at a ratio of 0.5:1 to 10:1.

The process of the present invention makes possible the preparation of copolymers from conjugated dienes and monovinylaromatic compounds having a random distribution of monomer units in a polymer chain, with the molecular weight being controlled over a wide range. The employment of metallic lithium in the form of granules as a catalyst makes the process less sensitive to the presence of impurities such as atmospheric moisture and oxygen thus cutting down expenses for additional purification of starting components.

The employment of metallic lithium makes it possible to avoid the preparation of an organolithium compound.

Taking into account that an organolithium compound is, as a rule, obtained by reaction Li+RCl → LiR+LiCl the employment of metallic lithium in lieu of LiR results in a decreased consumption of lithium per unit of final product.

The preparation of modifying additives presents no difficulties, as raw materials used are available and inexpensive, and the process can be easily carried out in a conventional technological equipment.

The employment of an aliphatic hydrocarbon-methylaromatic hydrocarbon mixture as a solvent makes possible the control of the copolymer molecular weight by varying the ratio of said hydrocarbons at a constant concentration of the modifying additive.

This enables the efficiency of the equipment to be substantially increased and the consumption of lithium to be decreased by 3–10 times as compared to the case when an aliphatic hydrocarbon alone is used as a solvent.

The process of this invention is characterized by good reproducibility and can be easily carried out on an industrial scale.

Other merits and advantages of the process of the present invention will be seen from a comprehensive description of a variant of the process.

Into a hermetic apparatus equipped with stirring and filtering devices were placed granules of metallic lithium ($d$=5 mm, $l$=6–7 mm) obtained, e.g., by pressing the metal through a die or by mold pressing or by some other method. The stirring device provides an effective circulation of the reaction mixture and friction of granules without crushing. The internal diameter of the filtering device orifice was much smaller than the size of the metal granules. The metal granules were fed into the apparatus in a high excess as compared to the amount of metal needed to initiate the polymerization process for one batch.

Then into the apparatus were placed a liquid hydrocarbon solvent, monomers and a solution of a modifying additive. The reaction mixture was brought up to a temperature of 0° to 100°C, preferably 60°–80°C, whereupon the stirring device was put into operation. After 1.5 hour the pressure in the apparatus began to drop (the induction period). The polymerization was carried out for 4 hrs. Then the reaction products were discharged from the reactor. The polymer solution thus obtained was treated with ethanol, an antioxidant was added and the polymer was dried under reduced pressure. Measurements were made of the polymer intrinsic viscosity in benzene solution at 25°C, the content of styrene in the polymer, the microstructure of the polybutadiene portion (determined by means of infrared spectroscopy), and the content of styrene in the form of blocks (determined by means of the oxidation reaction according to the Kolthoff's procedure, Journal of Polymer Science, 1,429 (1946).

Upon completion of polymerization the polymer solution was poured out through the filter and a new portion of the reaction mixture was introduced. One charge of the metal can be used for 20 to 100 polymerization cycles depending on the reactor design and the amount of metallic lithium.

It is particularly advantageous to carry out the process in a continuous manner. In this case a definite number of reactors were arranged in series wherein the first reactor was the only one to contain the catalyst, with the others providing a complete conversion of the starting monomers.

For a better understanding of the present invention by those skilled in the art, the following examples are presented by way of illustration.

Preparation of modifying additives

Procedure 1. Product of isobutyldiisobutoxyaluminum reaction with potassium hydroxide (I).

To a solution of isobutyldiisobutoxyaluminum in hexane whose concentration is 0.21 g-eqv/1 granulated potassium hydroxide is added. The reaction starts immediatedly and the reaction mixture warms up. The mixture was allowed to stand for several hours with shaking at intervals. Then the precipitated potassium hydroxide was separated from a transparent solution wherein the content of aluminum (0.21 g.-atom/1) and potassium (0.056 g.-atom/1) was determined. The ratio Al/K is found to be 3.75.

Procedure II. Product of triisobutylaluminum reaction with potassium carbonate (II).

To a solution of triisobutylaluminum in toluene whose concentration is 0.283 g.-mole/1 powdered potassium carbonate dried under vacuum is added. The mixture is kept for 2 hours at 70°–80°C with shaking at intervals. Then a transparent solution was separated from a precipitate and the content of aluminum (0.283 g.-atom/1) and potassium (0.198 g.-atom/1) in the solution was measured. The ratio Al/K is 1.4. To the obtained solution the triisobutyldiisobutoxyaluminum is added until the ratio Al/K is 3.7.

Procedure III. Product of triisobutylaluminum reaction with potassium acetate.

The product was prepared by a procedure described in (II). The content of aluminum (0.236 g.-atom/1) and potassium (0.026 g.-atom/1) in the solution was measured, the ratio Al/K being 9.2.

EXAMPLE 1

A hermetic apparatus equipped with a stirrer and filled up preliminarily with argon is charged with 13 pbw of metallic lithium in granules ($d$=5 mm, $l$=6–7 mm) and then with 660 pbw of hexane, 80 pbw of butadiene, 20 pbw of styrene and 15 ml of a hexane solution of the isobutyldiisobutoxyaluminum reaction product with potassium hydroxide prepared by procedure I. The solution of organopotassiumaluminum compound contained 0.019 pbw of aluminum. The ratio Al/K was 3.75. The reaction mixture was heated up to 75°C and then a stirrer was set in motion. One and a half hour later the pressure in the apparatus began to drop (induction period). Polymerization was carried out for 4 hours, then a polymer solution was poured out of the apparatus, passed through a filter and coagulated with ethanol, just after this an antioxidant is added.

The resulting copolymer has the following characteristics. Intrinsic viscosity measured in benzene at 25°C is 2.65. Styrene proportion in a polymer is 19.2%. Proportion of styrene in blocks found by the method of Kolthoff is 0.5%.

Microstructure of a butadiene portion:

| Units content: | 1,4-cis-47% |
|---|---|
| Units content: | 1,4-trans-41% |
| Units content: | 1,2   12% |

EXAMPLE 2

A hermetic apparatus equipped with a stirrer which contained metallic lithium in granules washed with hexane according to the procedure described in Example 1, was charged with 660 pbw of hexane, 80 pbw of butadiene, 20 pbw of styrene and 4.5 ml of hexane solution of the isobutyldiisobutoxyaluminum reaction product with potassium hydroxide containing 0.057 pbw of aluminum and prepared by the procedure described in Example 1. The ratio Al/K=3.75.

The Example is carried out by a procedure described in Example 1.

The resulting copolymer has the following characteristics. Intrinsic viscosity measured in benzene at 25° is 0.9. Proportion of styrene is 19.5. The copolymer has no styrene in blocks.

Microstructure of the diene portion:

| Units content: | 1,4-cis-48% |
| Units content: | 1,4-trans-40% |
| Units content: | 1,2   12% |

EXAMPLE 3

(Control test performed for comparison with the test described in Example 2).

A hermetic apparatus equipped with a stirrer which contained metallic lithium in granules washed up with hexane after the test described in Example 2 was charged with 660 pbw of hexane, 80 pbw of butadiene, 20 pbw of styrene and a solution of isobutyldiisobutoxyaluminum in hexane containing 0.057 pbw of aluminum.

The experiment is carried out by the procedure described in Example 1.

The resulting copolymer has the following characteristics. Intrinsic viscosity measured in benzene at 25°C is 1.1. Proportion of styrene in blocks is found to be 11.0% (56%-based on the total content of styrene in a copolymer).

Microstructure of the diene portion:

| Units content: | 1,4-cis-47% |
| Units content: | 1,4-trans-41% |
| Units content: | 1,2   12% |

EXAMPLE 4

The experiment is carried out by the procedure described in Example 1.

A solution of the product prepared by procedure 1 is used in an amount which corresponds to 0.038 pbw of overall aluminum content.

The resulting copolymer has the following characteristics. Intrinsic viscosity measured in benzene at 25°C is 2. Styrene proportion is 19.8%. The copolymer contains no styrene in blocks.

Microstructure of the diene portion:

| Units content: | 1,4-cis-46% |
| Units content: | 1,4-trans-42% |
| Units content: | 1,2   12% |

EXAMPLE 5

The experiment is carried out by the procedure described in Example 1.

The solvent used is a mixture of hexane and toluene taken in a ratio of 8:1, whereas a toluene solution of the product 1 contains 0.007 pbw of aluminum. The ratio Al/K=4.7.

The resulting copolymer has the following characteristics. Intrinsic viscosity measured in benzene at 25°C is 1.25. Proportion of styrene in blocks is 0.15%.

Microstructure of the butadiene portion:

| Units content: | 1,4-cis-48% |
| | 1,4-trans-41% |
| | 1,2   11% |

EXAMPLE 6

The experiment is carried out by the procedure described in Example 5.

The solvent used was a mixture of hexane and toluene taken in the ratio 1:1.25.

The resulting copolymer has the following characteristics. Intrinsic viscosity measured in benzene at 25°C is 0.5. Styrene proportion in the copolymer is 19.3%. Proportion of styrene in blocks is 0.1%.

Microstructure of the diene portion:

| Units content: | 1,4-cis-48% |
| | 1,4-trans-41% |
| | 1,2   11% |

EXAMPLE 7

A hermetic apparatus equipped with a stirrer which contained metallic lithium in granules washed with toluene after a preceding test was charged with 800 pbw of toluene, 80 pbw of butadiene, 20 pbw of styrene and with a toluene solution of the isobutyldiisobutoxyaluminum reaction product with sodium hydroxide containing 0.032 pbw of aluminum. The ratio Al/Na=4.8.

The experiment is carried out by the procedure described in Example 1.

The resulting copolymer has the following characteristics. Intrinsic viscosity measured in benzene at 25°C is 1.5. Styrene proportion in the copolymer is 17.1%. The proportion of styrene in blocks is 0.4%.

Microstructure of the butadiene portion:

| Units content: | 1,4-cis-39% |
| Units content: | 1,4-trans-35% |
| Units content: | 1,2   26% |

EXAMPLE 8

The experiment is carried out by the procedure described in Example 1.

As a modifying additive a hexane solution of triisobutoxyaluminum reaction product with potassium hydroxide containing 0.06 pbw of aluminum is used. The ratio Al/K=3.75.

The resulting copolymer has the following characteristics. Intrinsic viscosity measured in benzene at 25°C is 1.1. Styrene proportion is 19.5%. The copolymer contains no styrene in blocks.

Microstructure of the diene portion:

| Units content: | 1,4-cis-46% |
| Units content: | 1,4-trans-40% |

-continued

Units content: 1,2     14%

EXAMPLE 9

The experiment is carried out by the procedure described in Example 1.

As a modifying additive the solution of a product of triisobutylaluminum reaction with potassium carbonate prepared by the described procedure (II) is used. The solution of the organopotassiumaluminum compound contains 0.0056 pbw of aluminum. The solvent used is a mixture of hexane and toluene taken in the ratio 8:1.

The resulting polymer has the following characteristics. Intrinsic viscosity measured in benzene at 25°C is 2.35. Proportion of styrene in blocks is 0.6%.

Microstructure of the diene portion:

| Units content: | 1,4-cis-45% |
| Units content: | 1,4-trans-41% |
| Units content: | 1,2    14% |

EXAMPLE 10

The experiment is carried out by the procedure described in Example 1.

As a modifying additive the solution of a product of triisobutylaluminum reaction with potassium acetate prepared by the above described procedure (III) is used. The solution of the organopotassiumaluminum compound contained 0.028 pbw of aluminum.

The resulting polymer has the following characteristics. Intrinsic viscosity measured in benzene at 25°C is 2.3. Proportion of styrene in blocks is 1.0%.

Microstructure of the diene portion:

| Units content: | 1,4-cis-47% |
| Units content: | 1,4-trans-42% |
| Units content: | 1,2    11% |

EXAMPLE 11

The experiment is carried out in a continuous reactor. In a separate apparatus was prepared a mixture comprising toluene, butadiene, styrene and the reaction product of isobutyldiisobutoxyaluminum and potassium hydroxide; monomer concentration in the mixture is 10% by weight; the butadiene and styrene ratio is 81.5:18.5; the ratio Al/K in the modifying additive is 4.7. Concentration of aluminum in the reaction mixture is 0.0004 g-atom/l.

The obtained reaction mixture is fed into a reactor preliminarily charged with 400 g of metallic lithium in granules. Polymerization is initiated at a temperature of 25°–30°C in an argon atmosphere. Then the active reaction mixture is fed into a polymerizing battery composed of several reactors connected in series wherein the conversion of monomers achieved nearly 100% at a temperature from 60° to 90°C.

Depending on the reaction mixture feed rate, the resulting polymer has the following characteristics:

Table 1

| Run N | Reaction mixture feed rate, l/hr | Intrinsic viscosity in benzene at 25°C | Styrene in copolymer total styrene % by weight | styrene in blocks, % by weight |
|---|---|---|---|---|
| 1 | 20 | 0.25 | 18.5 | 0.0 |
| 2 | 30 | 0.38 | 18.2 | 0.0 |
| 3 | 40 | 0.51 | 18.3 | 0.0 |
| 4 | 50 | 0.62 | 18.3 | 0.0 |
| 5 | 100 | 1.4 | 18.0 | 0.1 |
| 6 | 150 | 2.1 | 17.9 | 0.4 |

EXAMPLE 12

(Control test performed for comparison with the experiment described in Example 2).

The experiment is carried out by the procedure described in Example 2, but instead of a reaction product of isobutyldiisobutoxyaluminum with potassium hydroxide only isobutyldiisobutyxyaluminum is used, the concentration of aluminum in a reaction mixture being 0.0004 g-atom/l.

Depending on the reaction mixture feed rate, the resulting copolymer has following characteristics.

Table II

| Run N | Reaction mixture feed rate, l/hr | Intrinsic viscosity in benzene at 25°C | Styrene in copolymer total styrene % by weight | styrene in blocks, % by weight |
|---|---|---|---|---|
| 1 | 14 | 1.4 | 18.2 | 0.0 |
| 2 | 16 | 1.8 | 17.92 | 0.0 |
| 3 | 18 | 2.2 | 18.5 | 0.3 |
| 4 | 20 | 2.45 | 17.8 | 1.7 |
| 5 | 22 | 2.88 | 18.92 | 3.8 |

The basic mixture used comprised the following components by weight:

| Elastomer | 100 |
| Higharomatic oil | 5.0 |
| Stearic acid | 2.6 |
| Zinc Oxide | 3.0 |
| Santocure | 0.7 |
| HAF black | 56.0 |
| Sulfur | 1.5 |
| Total: | 162.8 |

The physical properties of the vulcanizates prepared in Examples 11 and 12 were determined and the results are set forth below in Table III.

Table III

| Properties | Example 11 | | Example 12 | | |
|---|---|---|---|---|---|
| | 5 | 6 | 1 | 3 | 5 |
| 300% Modulus, kg/cm$^2$) | 153 | 112 | 126 | 140 | 104 |
| Tensile strength, kg/cm$^2$) | 258 | 260 | 222 | 268 | 241 |
| Elongation at break, % | 547 | 632 | 615 | 550 | 602 |
| Elongation set, % | 13 | 14 | 22 | 7 | 13 |
| Resilience, % | | | | | |
| 20°C | 55 | 52 | 44 | 49 | 46 |
| 100°C | 56 | 55 | 48 | 53 | 52 |
| Brittle point, °C | −75 | −75 | −78 | −75 | −75 |
| Microstructure content, % | | | | | |
| 1,4-cis | 42 | 48 | 43 | 46 | 53 |
| 1,4-trans | 44 | 40 | 44 | 42 | 33 |
| 1,2 | 14 | 12 | 13 | 12 | 12 |

What we claim is:

1. A method of preparing copolymers of conjugated diene monomers and monovinylaromatic monomers having a random distribution of monomer units which comprises copolymerizing said monomers in the presence of metallic lithium in granules as catalyst, and a modifying additive soluble in the reaction medium, said additive being the reaction product of a compound selected from the group consisting of potassium carbonate, potassium acetate, potassium hydroxide, sodium carbonate, sodium acetate and sodium hydroxide with an organoaluminum compound of the formula AlR$_m$' R$_n$'', in which R' is selected from the group consisting of alkyl, aryl and aralkyl radicals, and radicals of the formula —OR''', —SR''', NR$_2$''';

R'' is selected from the group consisting of alkoxy and aryloxy radicals;

R''' is selected from the group consisting of alkyl, aryl, aralkyl radicals and hydrogen;

m and n are integers from 0 to 3, inclusive, for the reaction product of said organoaluminum compound with said carbonates and acetates;

m are integers from 0 to 2, inclusive, and n are integers from 1 to 3, inclusive, for the reaction product of said organoaluminum compound with said hydroxides wherein the ratio of g-atoms of aluminum to 1 g-atom of sodium or potassium is from 2 to 20, said modifying additive being taken in an amount which corresponds to $1.10^{-5}$ to $2.10^{-1}$ g-atoms of aluminum per 100 g of said copolymerizing monomers; and said copolymerization being effected in solution in a liquid hydrocarbon solvent which is inert to the initial components.

2. A method as claimed in claim 1 wherein the modifying additive is used in an amount which corresponds to $1.10^{-4}$ to $1.10^{-3}$ g-atoms of aluminum per 100 g of copolymerizing monomers.

3. A method as claimed in claim 1 wherein the ratio of g-atoms of aluminum to g-atoms of potassium or sodium in the modifying additive is from 3 to 10.

4. A method as claimed in claim 2 wherein the ratio of g-atoms of aluminum to g-atoms of potassium or sodium in the modifying additive can be from 3 to 10.

5. A method as claimed in claim 1 wherein the modifying additive is the reaction product of isobutyl-diisobutoxyaluminum with potassium hydroxide, the ratio of g-atoms of aluminum to g-atoms of potassium being 4.7.

6. A method as claimed in claim 2 wherein the modifying additive is the reaction product of isobutyl-diisobutoxyaluminum with potassium hydroxide, the ratio of g-atoms of aluminum to g-atoms of potassium being 4.7.

7. A method as claimed in claim 1 wherein the copolymerization is effected at a temperature of 60°–80°C.

8. A method as claimed in claim 4 wherein the copolymerization is effected at a temperature of 60°–80°C.

9. A method as claimed in claim 6 wherein the copolymerization is effected at a temperature of 60°–80°C.

10. A method as claimed in claim 1 wherein the conjugated diene monomer is butadiene and the monovinylaromatic monomer is styrene.

11. A method as claimed in claim 7 wherein the conjugated diene monomer is butadiene and the monovinylaromatic monomer is styrene.

12. A method as claimed in claim 8 wherein the conjugated diene monomer is butadiene and the monovinylaromatic monomer is styrene.

13. A method as claimed in claim 9 wherein the conjugated diene monomer is butadiene and the monovinylaromatic monomer is styrene.

14. A method as claimed in claim 1 wherein the liquid hydrocarbon solvent is a mixture of hexane and toluene taken in a ratio from 0.5:1 to 10:1.

15. A method as claimed in claim 10 wherein the liquid hydrocarbon solvent is a mixture of hexane and toluene taken in a ratio from 0.5:1 to 10:1.

16. A method as claimed in claim 11 wherein the liquid hydrocarbon solvent is a mixture of hexane and toluene taken in a ratio from 0.5:1 to 10:1.

17. A method as claimed in claim 12 wherein the liquid hydrocarbon solvent is a mixture of hexane and toluene taken in a ratio from 0.5:1 to 10:1.

18. A method as claimed in claim 13 wherein the liquid hydrocarbon solvent is a mixture of hexane and toluene taken in a ratio from 0.5:1 to 10:1.

* * * * *